US007266734B2

(12) United States Patent
Chavez, Jr. et al.

(10) Patent No.: US 7,266,734 B2
(45) Date of Patent: Sep. 4, 2007

(54) GENERATION OF PROBLEM TICKETS FOR A COMPUTER SYSTEM

(75) Inventors: Jose R. Chavez, Jr., Tucson, AZ (US); James D. McKalko, Loveland, CO (US); John A. Rexroth, Loveland, CO (US); Todd D. Robinson, Boulder, CO (US)

(73) Assignee: International Business Machines Corporation, Armonk, NY (US)

( * ) Notice: Subject to any disclaimer, the term of this patent is extended or adjusted under 35 U.S.C. 154(b) by 820 days.

(21) Appl. No.: 10/641,942

(22) Filed: Aug. 14, 2003

(65) Prior Publication Data

US 2005/0039192 A1 Feb. 17, 2005

(51) Int. Cl.
*G06F 11/00* (2006.01)
(52) U.S. Cl. .............................. 714/48; 714/26; 714/57
(58) Field of Classification Search ................. 714/26, 714/30, 31, 48, 57; 709/224
See application file for complete search history.

(56) References Cited

U.S. PATENT DOCUMENTS

| 6,742,141 | B1 * | 5/2004 | Miller | 714/26 |
|---|---|---|---|---|
| 7,051,244 | B2 * | 5/2006 | Fisher et al. | 714/48 |
| 7,062,670 | B1 * | 6/2006 | Larsson et al. | 714/4 |
| 2002/0129110 | A1 | 9/2002 | Liu et al. | 709/206 |
| 2002/0147524 | A1 | 10/2002 | Nickum | 700/204 |
| 2002/0154010 | A1 | 10/2002 | Tu | 340/517 |
| 2002/0156601 | A1 | 10/2002 | Tu | 702/188 |
| 2002/0156785 | A1 | 10/2002 | Kumar et al. | 707/10 |
| 2002/0165842 | A1 | 11/2002 | Hellerstein et al. | 706/47 |
| 2002/0184408 | A1 | 12/2002 | Hunnigan et al. | 709/328 |
| 2002/0188522 | A1 | 12/2002 | McCall | 705/26 |
| 2003/0112452 | A1 | 6/2003 | Mcintyre | 358/1.1 |
| 2003/0120661 | A1 | 6/2003 | Mets et al. | 707/100 |
| 2003/0125993 | A1 | 7/2003 | Ho et al. | 705/5 |
| 2003/0126307 | A1 | 7/2003 | Lindner et al. | 709/318 |

OTHER PUBLICATIONS

"URL." Microsoft Computer Dictionary (fifth edition). Copyright 2002. Microsoft Press.*

* cited by examiner

*Primary Examiner*—Robert Beausoliel
*Assistant Examiner*—Philip Guyton
(74) *Attorney, Agent, or Firm*—Arthur J. Samodovitz

(57) ABSTRACT

A computer system and program product for managing events. Program instructions, respond to notification of an event, by determining if a problem ticket can be automatically generated for the event. If so, the program instructions make a request to generate the problem ticket. The program instructions determine if the problem ticket can be automatically generated based in whole or in part on (a) a type of the event and a customer who owns or uses a computer system in which the event occurred, (b) a type of the event, a customer who owns or uses a computer system in which the event occurred, and a severity of the event, (c) a type of the event, a customer who owns or uses a computer system in which the event occurred, and a magnitude of the event, or (d) a type of the event and whether other events of a same type occur at approximately a same time. If a determination is made that a problem ticket cannot be automatically generated, other program instructions notify or initiate notification of an operator and supply event information for the operator so that the operator can determine whether to generate a problem ticket.

4 Claims, 2 Drawing Sheets

GENERATION OF PROBLEM TICKETS FOR A COMPUTER SYSTEM

BACKGROUND OF THE INVENTION

The invention relates generally to computer systems, and deals more particularly with generation of problem tickets for a computer system.

Computer systems often experience problems such as overflow of buffers, exhaustion of storage allocated to an application, hard drive failures, power outages, software errors and resource constraints. When such a problem occurs or when a system condition exceeds a threshold suggesting an impending problem, a known hardware or software monitor within the computer system detects the "event", and sends an alert to a system console or a remote system. In either case, an operator or administrator will notice the event, and may take some corrective action. It was also known for the operator or administrator to create a "problem ticket" if warranted. To determine whether a problem ticket was warranted, the operator or administrator considered the type of problem and in some cases, the contractual obligations to the customer. When the problem ticket is warranted, the operator or administrator creates the problem ticket by obtaining an electronic form through a workstation, and entering the following information: customer name, problem type, severity level, source of problem (i.e. identity of hardware or software component) within the customer's computer system, operating system, network, and application. The operator or administrator then sends the problem ticket by e-mail to a suitable technical support person or support center for handling, i.e. correcting the problem. While the foregoing technique for determining whether to generate a problem ticket, generating the problem ticket and sending the problem ticket to the support person was effective, it required significant effort by an operator or administrator.

Therefore, an object of the present invention is to automate the process of determining whether to generate a problem ticket and if warranted, automate the process of generating the problem ticket and sending it to a suitable support person.

SUMMARY OF THE INVENTION

The invention resides in a computer system and program product for managing events. Program instructions, respond to notification of an event, by determining if a problem ticket can be automatically generated for the event. If so, the program instructions make a request to generate the problem ticket. The program instructions determine if the problem ticket can be automatically generated based in whole or in part on (a) a type of the event and a customer who owns or uses a computer system in which the event occurred, (b) a type of the event, a customer who owns or uses a computer system in which the event occurred, and a severity of the event, (c) a type of the event, a customer who owns or uses a computer system in which the event occurred, and a magnitude of the event, or (d) a type of the event and whether other events of a same type occur at approximately a same time.

According to one feature of the present invention, if a determination is made that a problem ticket cannot be automatically generated, other program instructions notify or initiate notification of an operator and supply event information for the operator so that the operator can determine whether to generate a problem ticket.

DETAILED DESCRIPTION OF THE PREFERRED EMBODIMENTS

Figure 1:
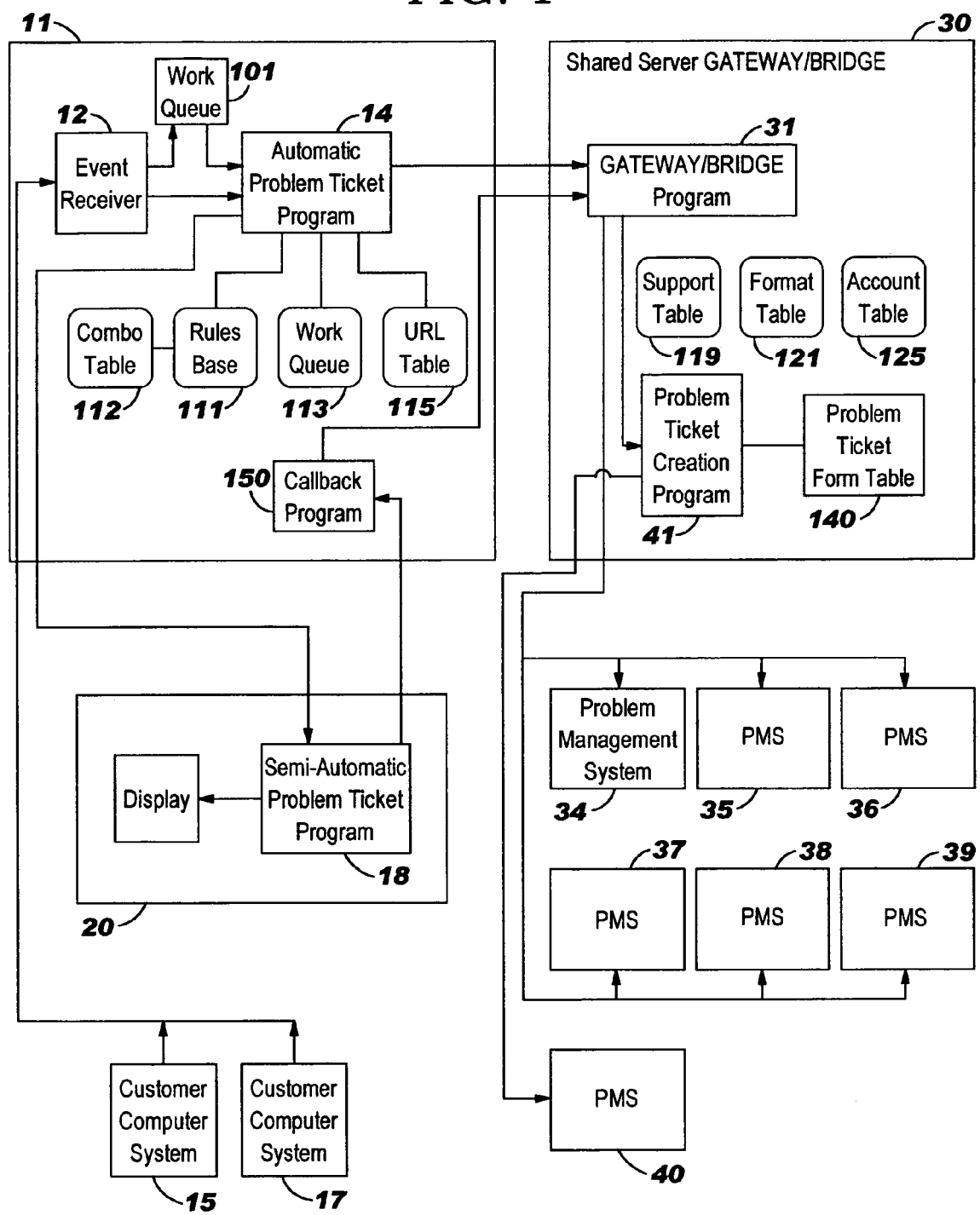
FIG. 1 is a block diagram illustrating a computer system which includes the present invention.

Referring now to the drawings in detail wherein like reference numbers indicate like elements throughout, FIG. 1 illustrates a computer system generally designated 10 which includes the present invention. System 10 comprises an event management server 11 which includes an event receiver program 12. Program 12 receives notification of events from other, customer computer systems 15 and 17 via various event management protocols. System 10 also includes an automatic problem-ticket function 14 which receives notification of problems/events from the event receiver program 12, and determines whether a problem ticket should be generated automatically. If so, program 14 generates a problem ticket creation message (containing problem ticket information). If program 14 determines that a problem ticket cannot be generated automatically, program 14 notifies a semiautomatic problem ticket program 18 within server 11 console or workstation 20. In response, program 18 directs display at console or workstation 20, information about the problem and requests that a workstation operator furnish additional information for a problem ticket creation message. Program 18 also requests that the operator decide whether a problem ticket should be generated. If so, program 18 will generate the problem ticket creation message. The problem ticket creation message, whether sent by function 14 or 18, is sent to a shared server gateway/bridge 30. Gateway/bridge 30 then forwards the problem ticket creation message to one of a plurality of problem management systems 34, 35 or 36, or 37, 38 or 39 or 40, that supports the customer system where the problem originated. In the illustrated example, problem management systems 34-36 are all the same type, for example, IBM eESM system. Also, in the illustrated example, problem management systems 37-39 are all the same type, for example, Mcafee Help Desk ("MHD") system. Both of these types of problem management systems can create problem tickets based on a problem ticket creation message. However, problem management system 40 (for example, Remedy or Peregrine problem management systems) cannot automatically create a problem ticket based on a problem ticket creation message. Therefore, gateway/bridge 10 also includes a problem ticket creation program 41 which can automatically create a problem ticket for problem management system 40 based on a problem ticket creation message. All of the problem management systems 34, 35 or 36, or 37, 38 or 39 or 40 also track the handing of the problems. There are other commercially available problem management systems available today, which can be used with the present invention. Some of these other problem management systems are able to automatically generate a problem ticket based on a problem ticket creation message; others cannot.

Figure 2:
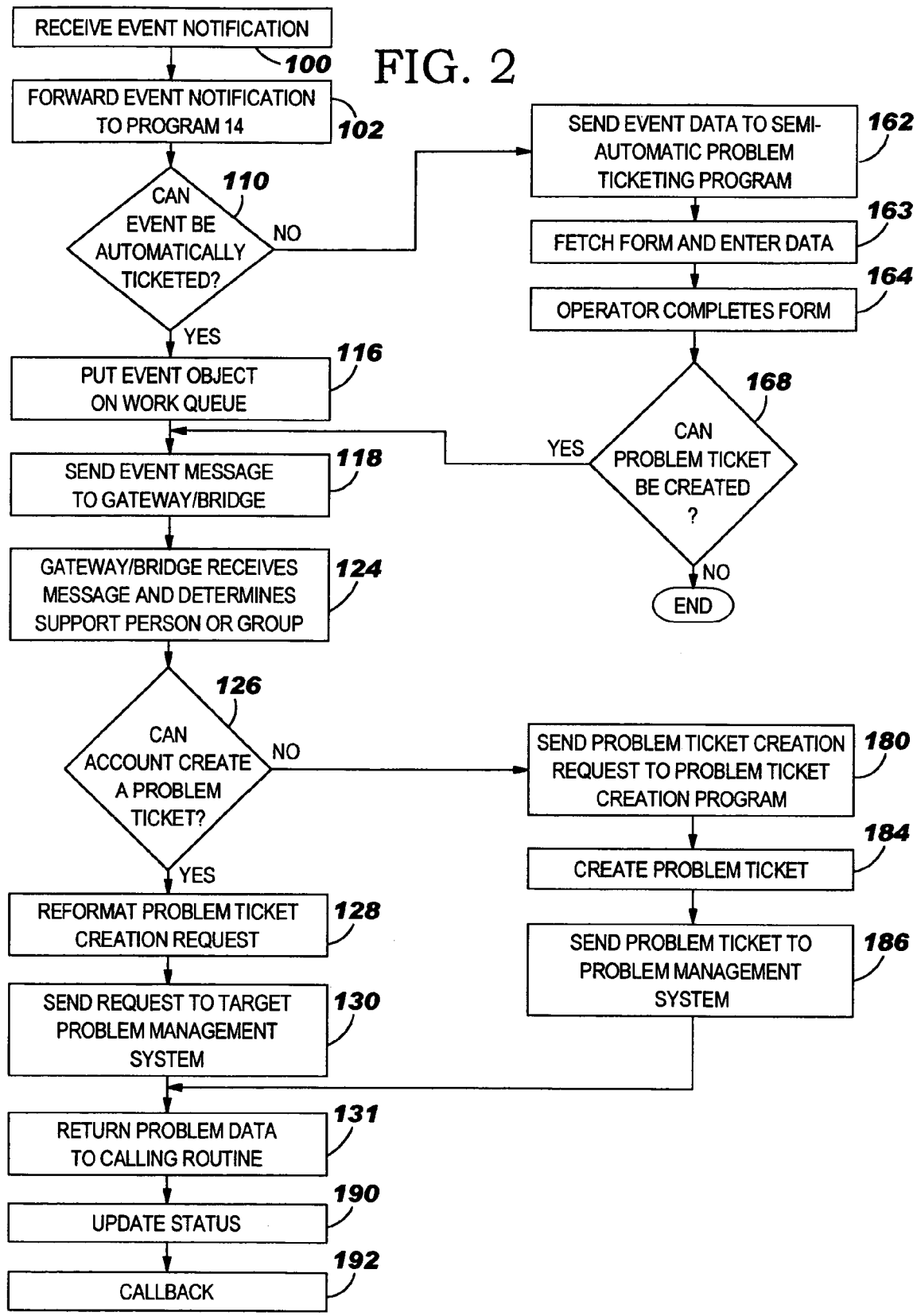
FIG. 2 is a flow chart illustrating processing according to the present invention.

The following is a more detailed description of processing of an event notification within system 10, according to the present invention. As illustrated in FIG. 2, event receiver program 12 within server 11 receives event notifications either from the customer systems 15 and 17 where the problems arise or from intermediate management consoles (not shown) (step 100). The event notification include specification of event/problem type, account name, source of the event and event severity. In response, the event receiver program 12 formats the event notification to a generic form supported by program 14 and places the formatted event notification on an inbound work queue 101 for automatic ticket program 14 (step 102). Automatic problem ticket program 14 periodically monitors inbound work queue 101 and detects the event notification from program 12. Program 14 then determines if a problem ticket can be automatically generated for this event (decision 110). This determination is based on a rules base 111 maintained by program 14. For example, there can be a predetermined list 112 of combinations of event types and account names which are considered candidates for automatic problem ticket generation. If the combination of event type and account name in the event notification matches one of the predetermined combinations in list 112, the automatic problem ticket program 14 puts the event notification (in the form of a data object) on an outbound work queue 113. Another rule in rule base 111 could cause automatic problem ticketing based on the combination of event type, account name and event severity, so that only severe events of a certain type for a certain customer are automatically ticketed. Another rule in rule base 111 could cause automatic problem ticketing based on the combination of event type, account name and magnitude of event. For example, if there is ninety five percent disk capacity utilization for a certain customer, this event is automatically ticketed. (However, if there is ninety percent disk capacity utilization, this does not result in automatic problem ticket generation, even though this event is monitored and reported to server 11). Another possible rule in the rules base 11 applies when there are a multitude of similar events from the same customer site. For example, if there is a power outage at a customer site, all the servers at the site may send the same event notification, i.e. "node down". In such a case, a rule may indicate that program 14 should not automatically initiate creation of problem ticket(s), but instead, forward the event notification information to the operator at console or workstation 20 as described below. (In such a case, the operator will likely create just one problem ticket creation message.) Another possible rule in the rules base 11 applies when there are core events and other, related secondary events. For example, a hard drive failure may be considered a core event and there may be a rule allowing this event type/account to result in automatic problem ticketing. However, the hard drive failure may cause "secondary" application errors, hard drive warnings, and node down events, and there may be no rules for these secondary events. So, these secondary events would be passed to the operator at console or workstation 20 to determine whether to create a problem ticket creation message. Many other rules can be created and used by program 14, depending on the environment. If program 14 determines to automatically ticket the event notification, program 14 converts the notification data into a "data object" which it places on work queue 113 (step 116). This object comprises account name, event type, severity, host name, IP address and queue routing information.

Program 14 maintains a URL table 115 which lists the URL for each account/customer. All of the URLs are hosted by gateway/bridge 30. For each data object on the work queue 113, program 14 creates a problem ticket creation message in XML format, and sends it, using HTTPS protocol, to the URL for the account specified in the data object (which was obtained from the original event notification) (step 118). There can be multiple support people and/or support groups at each problem management system for the same account/customer, and the different support people and groups can have specialized expertise for respective types of events. The shared gateway server/bridge 30 maintains a support table 119 that lists for each event type, the support person or support group that has the requisite experience to handle the event, and therefore should get the problem ticket. So, in response to the XML message from program 14, a gateway/bridge program 31 (within shared server gateway/bridge 30) determines from the table 119 what support person or support group should get the ticket (step 124). For example, if the event type indicates a problem with disk capacity and that the operating system (where the problem occurred) is Windows NT, then a Windows NT support person or support team should get the problem ticket. As another example, the network domain name of a resource may be used to route the problem ticket to a support group organized by physical location or site. Gateway/bridge 30 also includes an account table 125 which lists which problem management systems/accounts can automatically create a problem ticket based on a problem ticket creation. Next, gateway/bridge program 31 determines if the account listed in the problem ticket creation message received from program 14 can automatically create a problem ticket (decision 126). Gateway/bridge program 31 maintains a table 121 which lists for each account the form of the problem ticket creation message that it should receive. This is based on the type of problem management system used by the account/customer. If the account's problem management system can automatically create a problem ticket based on the problem ticket creation message (decision 126, yes branch), gateway/bridge program 31 transforms the problem ticket creation message received from program 14 into the message form of the target problem management station used for the account specified in the XML message received from program 14 (step 128). Typically, the problem management systems define their own unique format for the problem ticket creation messages they support. This is the case with the eESM and MHD problem management systems. The problem ticket creation message for most target problem management systems includes the account name, event type, severity, identifier for source of problem and an identify of the support person or support group that should handle the problem ticket. Gateway/bridge program 31 then sends the reformatted problem creation message to the target problem management system using the Java DatabaseBase Connectivity (JDBC) protocol (step 130). Also, gateway/bridge 30 returns problem completion code data to the calling system (step 132).

The target problem management system 34-36 or 37-39 then creates the problem ticket based on the data in the problem ticket creation message and returns problem completion code data to the gateway/bridge 30. While there are various forms for a problem ticket, depending on the type of problem management system, they generally include the following information: account name, type, description, severity, and resource name. They also have a status field which can be changed as the status changes. They also have a support queue name.

The target problem management system also identifies from the reformatted problem ticket creation message the identity of the proper support person or support group to handle the problem ticket, and notifies this support person or support group. The target problem management system also creates a return code in XML format which it sends to the gateway/bridge program 31 using HTTPS protocol. Gateway/bridge program 31 returns the return code to the event receiver program 12 within server 11 using HTTPS protocol.

The possible return codes include "0" (success), "1" (web server unavailable) and "2" (problem management system unavailable), and also include a problem ticket number created by the target problem management system. Event receiver program 12 will automatically notify the operator at console or workstation 20 of this new problem at the target problem management system, and specify the problem ticket number for future reference.

Referring again to decision 126, if the target problem management system (such as problem management system 40) is not able to generate a problem ticket based on a problem ticket creation message, then gateway/bridge program 31 sends the problem ticket creation message to problem ticket creation program 41 (step 180). In response, problem ticket creation program 41 creates a problem ticket by the use of an SQL call (step 184). The form of the problem ticket is suited for the type of problem management system, and is based on problem ticket form information maintained in a problem ticket form table 140. Then, problem ticket creation program 41 sends the problem ticket to problem management system ("PMS") 40 (step 186).

Problem management system 40 also identifies from the problem ticket the identity of the proper support person or support group to handle the problem ticket, and notifies this support person or support group. Problem management system 40 also creates a return code in XML format which it sends to the gateway/bridge program 31 using HTTPS protocol. Gateway/bridge program 31 returns the return code to the event notification program 12 within server 11 using HTTPS protocol. The possible return codes include "0" (success), "1" (web server unavailable) and "2" (problem management system unavailable), and also include a problem ticket number created by the target problem management system 40. Event notification program 12 will automatically notify the operator at console or workstation 20 of this new problem at the target problem management system, and specify the problem ticket number for future reference.

After handling the problem (in part or in full), the support person at the target problem management station can call the operator at the console or workstation 20 (with the problem ticket number) to change the status of the problem ticket. The operator can then change the status by fetching the file corresponding to the problem ticket number and entering the new status (step 190). Console or workstation 20 then passes this new status as an XML status message to a callback program 150 within server 11, and program 150 will then forward the XML status message using HTTPS protocol to the shared server gateway/bridge 30 (step 192). The gateway/bridge program 31 then reformats the status message to the format of the target problem management station, and the target problem management system will automatically update the status of the problem ticket.

Refer again to decision 110, where program 14 cannot request automatic ticketing of the event. This could be due to the absence of a rule in the rule base 111 for automatic ticketing of the event or insufficient information about the event in the event notification received from the customer computer system 15 or 17. For example, there may be certain combinations of event types and account names which are not found in table 112. As another example, the event type may not omitted in the event notification. In any such case where the event cannot be automatically ticketed, program 14 sends to console or workstation 20 (instead of shared gateway server/bridge 30) all the relevant available information about the event, i.e. event type, account, severity, identity of component where the event occurred and IP address (step 162). This information can be sent to the semiautomatic problem ticket program 18 through operator-initated actions. Program 18 then fetches and displays a problem information form (step 163). The following are the fields in this form, and program 18 fills in whatever fields it can based on the information that it has received from program 14 (step 163). Then, the operator can fill-in any blank fields, such as those indicating the event type (or which support person or group should handle the problem), the event type or the severity of the problem, if not already supplied by program 18 (step 164). The operator also decides whether a problem ticket should be opened for this event (decision 168), assuming all the necessary information (i.e. account name, event type, severity, host name, IP address and queue routing) has been filled into to the form. If the operator decision is to open a problem ticket, program 18 creates a corresponding problem ticket creation message in XML format, and sends it to shared gateway server/bridge 30 in HTTPS protocol. At this point, gateway/bridge 30 responds the same as if the problem ticket creation message originated from program 14. Likewise, the target problem management system and support person or support group will respond as if the problem ticket creation message originated from program 14.

Based on the foregoing, systems and methods have been disclosed for determining whether to automatically generate a problem ticket, and if so, which problem ticket management system should receive the event information and open the problem ticket and which support person or support group should handle the problem ticket. If the problem ticket cannot be automatically generated, the systems and methods notify an operator and assist the operator in initiating creation of a problem ticket. However, numerous modifications and substitutions can be made without deviating from the present invention. For example, a different problem ticket creation message format can be used in support of another problem management system. Therefore, the present invention has been disclosed by way of illustration and not limitation, and reference should be made to the following claims to determine the scope of the present invention.

The invention claimed is:

1. A computer program product for managing events, said computer program product comprising:
a computer readable medium;
program instructions, responsive to notification of an event, to determine if a problem ticket can be automatically generated for said event, and if so, making a request to generate said problem ticket; and wherein
said program instructions determine if said problem ticket can be automatically generated based in whole or in part on (a) a type of said event and a customer who owns or uses a computer system in which the event occurred, (b) a type of said event, a customer who owns or uses a computer system in which the event occurred, and a severity of said event, (c) a type of said event, a customer who owns or uses a computer system in which the event occurred, and a magnitude of said event, or (d) a type of said event and whether other events of a same type occur at approximately a same time;
if the first said program instructions determine that said problem ticket cannot be automatically generated, said computer program product further comprising second program instructions to notify or initiate notification of an operator and supply event information for said operator so that said operator can determine whether to generate a problem ticket; and said first and second program instructions are recorded on said medium.

2. A computer program product as set forth in claim 1 wherein said computer program product further comprises third program instructions to solicit from said operator problem ticket information and a decision whether to create a problem ticket; and wherein said third program instructions are recorded on said medium.

3. A computer program product for managing events, said computer program product comprising:

a computer readable medium;

program instructions, responsive to notification of an event, to determine if a problem ticket can be automatically generated for said event, and if so, making a request to generate said problem tickets; and wherein said program instructions determine if said problem ticket can be automatically generated based in whole or in part on (a) a type of said event and a customer who owns or uses a computer system in which the event occurred, (b) a type of said event, a customer who owns or uses a computer system in which the event occurred, and a severity of said event, (c) a type of said event, a customer who owns or uses a computer system in which the event occurred, and a magnitude of said event, or (d) a type of said event and whether other events of a same type occur at approximately a same time;

there is a gateway system with a plurality of URLs for respective problem management systems, and further comprising other program instructions to send said request to the URL of a target one of said problem management systems;

said other program instructions identify said URL based on a customer who owns or uses a computer system in which the event occurred; and the first said program instructions and said other program instructions are recorded on said media.

4. A computer program product for managing events, said computer program product comprising:

a computer readable medium;

program instructions, responsive to notification of an event, to determine if a problem ticket can be automatically generated or said event, and if so, making a request to generate said problem tickets; and wherein said program instructions determine if said problem ticket can be automatically generated based in whole or in part on (a) a type of said event and a customer who owns or uses a computer system in which the event occurred, (b) a type of said event, a customer who owns or uses a computer system in which the event occurred, and a severity of said event, (c) a type of said event, a customer who owns or uses a computer system in which the event occurred, and a magnitude of said event, or (d) a type of said event and whether other events of a same type occur at approximately a same time;

said computer program product further comprises other program instructions to identify a support person or support group to handle said problem ticket, based on a type of said event;

there is a gateway coupled for communication with a plurality of problem management systems, and said computer program product includes gateway program instructions, for execution at said gateway, to forward a problem ticket creation request to one of said problem management systems, said gateway program instructions determine said one problem management system based on a customer name associated with said event, and the problem management system which supports said customer; and the first said program instructions, said other program instructions, and said gateway program instructions are recorded on said medium.

* * * * *